(12) United States Patent
Takaya

(10) Patent No.: US 11,573,950 B2
(45) Date of Patent: Feb. 7, 2023

(54) ANALYSIS INFORMATION MANAGEMENT DEVICE AND ANALYSIS INFORMATION MANAGEMENT METHOD

(71) Applicant: SHIMADZU CORPORATION, Kyoto (JP)

(72) Inventor: Sadahiro Takaya, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/509,006

(22) Filed: Oct. 24, 2021

(65) Prior Publication Data

US 2022/0138176 A1 May 5, 2022

(30) Foreign Application Priority Data

Nov. 4, 2020 (JP) .............................. JP2020-184316

(51) Int. Cl.
*G06F 16/23* (2019.01)
(52) U.S. Cl.
CPC ............................... *G06F 16/2365* (2019.01)
(58) Field of Classification Search
CPC .................................................. G06F 16/2365
USPC ........................................................ 707/690
See application file for complete search history.

(56) References Cited

U.S. PATENT DOCUMENTS

| | | | | |
|---|---|---|---|---|
| 6,151,581 A | * | 11/2000 | Kraftson | G16H 10/20 707/999.102 |
| 2012/0265726 A1 | * | 10/2012 | Padmanabhan | G06F 16/214 707/602 |
| 2018/0268138 A1 | * | 9/2018 | Quintero Ramirez | G06F 16/178 |
| 2019/0087386 A1 | * | 3/2019 | Ono | G06Q 10/06 |
| 2021/0065116 A1 | * | 3/2021 | Mao | G06Q 30/0201 |
| 2021/0212168 A1 | * | 7/2021 | Yoden | H04L 67/561 |

FOREIGN PATENT DOCUMENTS

JP 6699669 B2 5/2020

* cited by examiner

*Primary Examiner* — James Trujillo
*Assistant Examiner* — Fariborz Khoshnoodi
(74) *Attorney, Agent, or Firm* — Renner, Otto, Boisselle & Sklar, LLP

(57) ABSTRACT

Selection of a batch file that causes an analysis device to analyze a sample successively is received by a receiver. Batch analysis data that represents an analysis result and corresponds to the batch file, selection of which is received, is acquired from a database device. Standard information, for verifying validity of an analysis performed by the analysis device, which corresponds to the batch file, selection of which is received, is acquired by a standard information acquirer from the database device. A report that describes an analysis result represented by the batch analysis data and an evaluation result in regard to validity of an analysis performed by the analysis device is created by a creator based on the acquired batch analysis data and the acquired standard information.

6 Claims, 4 Drawing Sheets

ANALYSIS INFORMATION MANAGEMENT DEVICE AND ANALYSIS INFORMATION MANAGEMENT METHOD

BACKGROUND

Technical Field

The present invention relates to an analysis information management device and an analysis information management method.

Description of Related Art

In an analysis information management system, a database server, one or more analysis appliances and a client terminal are connected to one another via a network line. In the database server, an analysis data file of a sample analysis performed by the analysis appliance and an audit trail report file representing various log information related to the analysis data file are registered while being associated with each other (see JP 6699669 B2, for example).

In a case where the user selects a desired analysis data file and provides an instruction for creating a set of reports, the selected analysis data file and the corresponding audit trail report file are sent to the client terminal from the database server. In the client terminal, a final result record report that describes the content of the analysis data file and the content of the audit trail report files is created. The created final result record report is registered in a database.

SUMMARY

In the analysis information management system described in JP 6699669 B2, the content of the audit trail report file is described in the final result record report. Therefore, it is possible to prove that an analysis result is obtained with a correct operation by presenting the final result record report created in an audit of the analysis appliance. However, it is not possible to conduct an audit of the analysis appliance sufficiently only by presenting the above-mentioned final result record report.

An object of the present invention is to provide an analysis information management device and an analysis information management method that facilitate an appropriate audit of an analysis device.

One aspect of the present invention relates to an analysis information management device that is communicable with a database device in which a batch file, causing an analysis device to analyze a sample successively, is registered, wherein batch analysis data representing an analysis result that is obtained by the analysis device and corresponds to the batch file, and standard information for verifying validity of an analysis performed by the analysis device are registered in the database device, to correspond to the batch file, and the analysis information management device includes a receiver that receives selection of the batch file registered in the database device, an analysis result acquirer that acquires the batch analysis data corresponding to the batch file, selection of which is received by the receiver, from the database device, a standard information acquirer that acquires the standard information corresponding to the batch file, selection of which is received by the receiver, from the database device, and a creator that creates a report including an analysis result represented by the batch analysis data and an evaluation result in regard to validity of an analysis performed by the analysis device based on the batch analysis data acquired by the analysis result acquirer and the standard information acquired by the standard information acquirer.

Another aspect of the present invention relates to an analysis information management method of communicating with a database device in which a batch file, causing an analysis device to analyze a sample successively, is registered, wherein batch analysis data representing an analysis result that is obtained by the analysis device and corresponds to the batch file, and standard information for verifying validity of an analysis performed by the analysis device are registered in the database device, to correspond to the batch file, the analysis information management method includes receiving selection of the batch file registered in the database device, acquiring the batch analysis data corresponding to the batch file, selection of which is received, from the database device, acquiring the standard information corresponding to the batch file, selection of which is received, from the database device, and creating a report describing an analysis result represented by the batch analysis data and an evaluation result in regard to validity of an analysis performed by the analysis device based on the acquired batch analysis data and the acquired standard information.

With the present invention, it is possible to conduct an audit of an analysis device appropriately and easily.

Other features, elements, characteristics, and advantages of the present disclosure will become more apparent from the following description of preferred embodiments of the present disclosure with reference to the attached drawings.

DETAILED DESCRIPTION (1) Configuration of Analysis System

Figure 1:
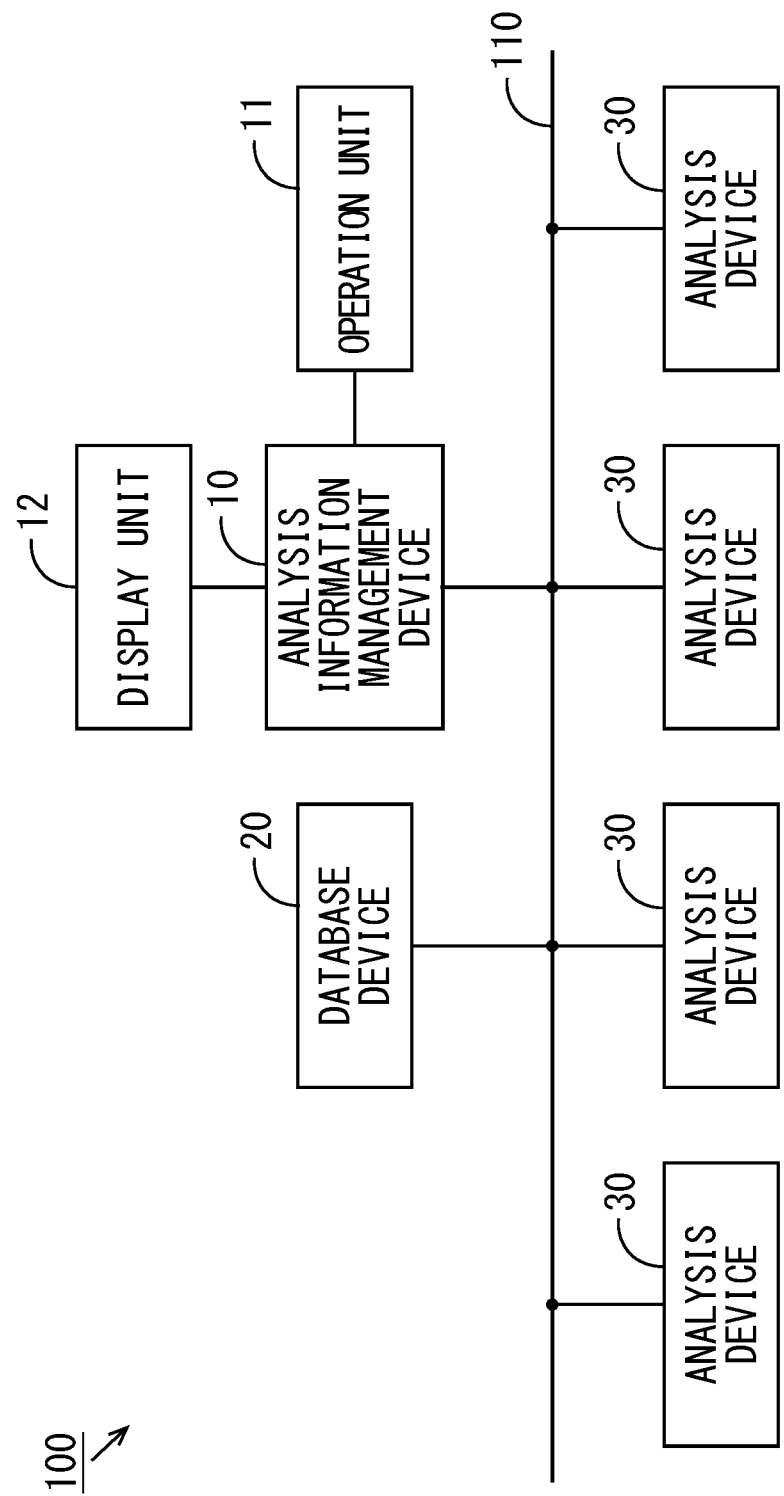
FIG. 1 is a diagram showing the configuration of an analysis system including an analysis information management device according to one embodiment of the present invention.

An analysis information management device and an analysis information management method according to embodiments of the present invention will be described below in detail with reference to the drawings. FIG. 1 is a diagram showing the configuration of an analysis system including the analysis information management device according to one embodiment of the present invention. As shown in FIG. 1, the analysis system 100 includes the analysis information management device 10, a database device 20 and a plurality of analysis devices 30. The analysis information management device 10, the database device 20 and each analysis device 30 are connected to a network 110 to be communicable with one another. A plurality of analysis information management devices 10 may be connected to the network 110.

The analysis information management device 10 is realized by an information processing apparatus such as a personal computer and includes a CPU (Central Processing Unit) and a memory, for example. The analysis information management device 10 produces a batch file for execution of a sample analysis sequence by the analysis device 30. The analysis information management device 10 can set an analysis method, for a sample analysis to be performed singly, which is different from the batch file.

Further, the analysis information management device 10 sets standard information for verifying validity of an analysis performed by the analysis device 30. The standard information includes system suitability information and QA (Quality Assurance)/QC (Quality Control) information. System suitability information is information that defines stability of the analysis device 30 and includes a range of a parameter (a temperature of an analysis column or a pressure of a liquid sending pump, for example) in regard to a constituent element of the analysis device 30. The QA/QC information is information that defines reliability of an analysis result and includes a range of a quantitative value of a sample, for example.

Further, the analysis information management device 10 sets various information such as sample information representing a type, a concentration or the like of an analysis sample, the configuration of the analysis information management device 10, a method of processing analysis data representing an analysis result obtained by the analysis device 30 and an analyst. Further, the analysis information management device 10 can create various reports representing a condition of a sample analysis, the operation history of the analysis information management device 10, a result of a sample analysis, stability of the analysis device 30, reliability of an analysis result, etc. The analysis information management device 10 creates an integrated report in which a plurality of reports are integrated. Details of the analysis information management device 10 will be described below.

An operation unit 11 and a display unit 12 are connected to the analysis information management device 10. The operation unit 11 includes a pointing device such as a mouse, and a keyboard, for example, and the user operates the operation unit 11 to perform various settings for the analysis information management device 10, provide an instruction for producing a batch file, provide an instruction for creating various reports, etc. The display unit 12 includes an LCD (Liquid Crystal Display) panel or an organic EL (Electroluminescence) panel, for example, and displays a result of analysis performed by the analysis device 30, various reports, an integrated report or the like.

The database device 20 includes a mass storage device such as a server. A batch file produced by the analysis information management device 10 is registered in the database device 20. Further, analysis data obtained by the analysis device 30 is registered in the database device 20. Further, the standard information and various batch related information that are associated with the batch file are registered in the database device 20. The batch related information includes the sample information, the operation history of the analysis information management device 10, the configuration of the analysis information management device 10, the method of processing data, information about an analyst, the date and time of an analysis and so on.

Each analysis device 30 includes a gas chromatograph, a liquid chromatograph, a mass spectrometer or the like. The types of the plurality of analysis devices 30 may be the same or different. Each analysis device 30 performs an analysis in regard to a sample successively (hereinafter referred to as a batch analysis) in accordance with the batch file registered in the database device 20. Further, each analysis device 30 can singly perform an analysis in regard to a sample (hereinafter referred to as a single analysis) in accordance with the analysis method produced by the analysis information management device 10.

(2) Analysis Information Management Device

Figure 2:
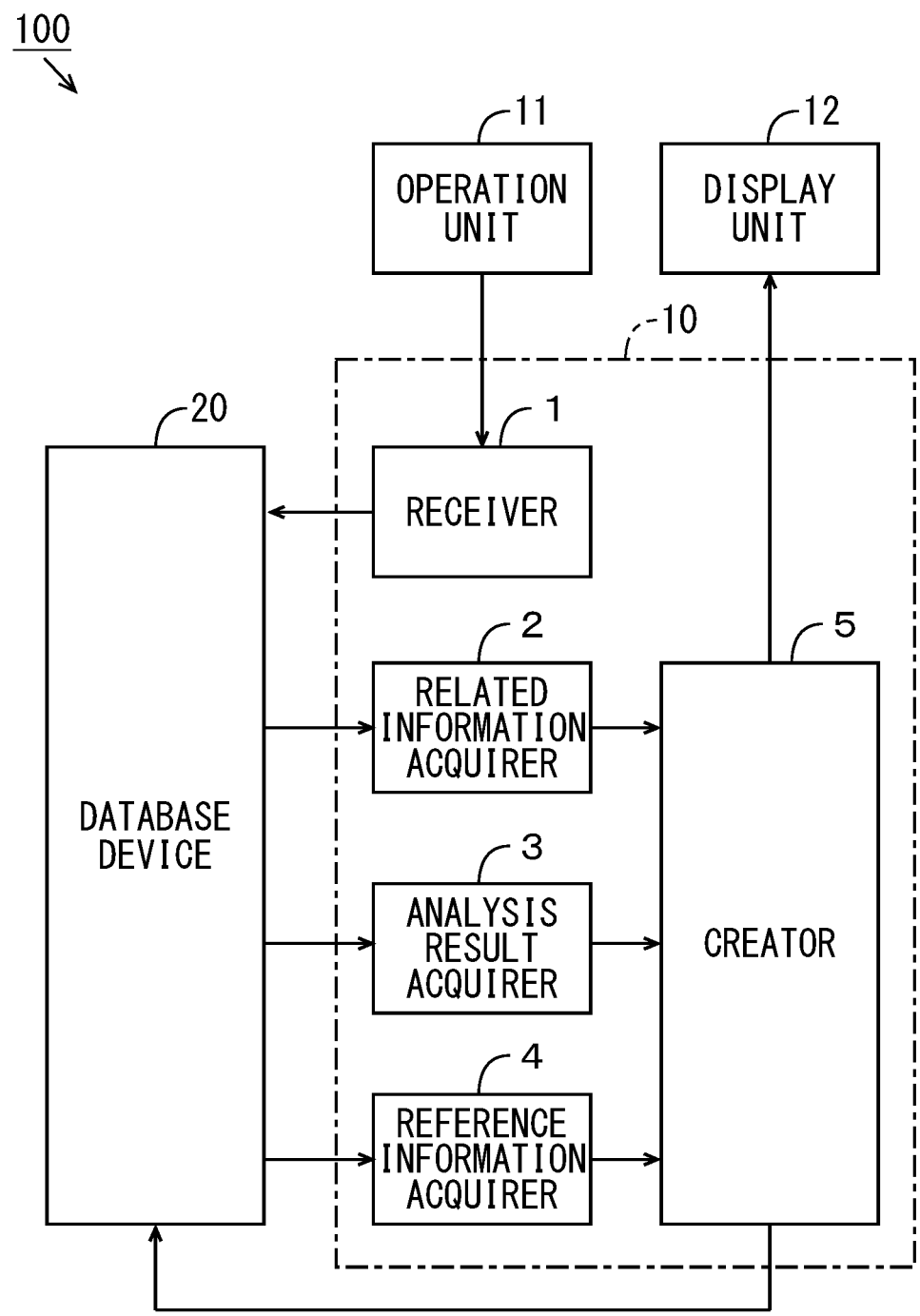
FIG. 2 is a diagram showing the configuration of the analysis information management device of FIG. 1.

FIG. 2 is a diagram showing the configuration of the analysis information management device 10 of FIG. 1. As shown in FIG. 2, the analysis information management device 10 includes a receiver 1, a related information acquirer 2, an analysis result acquirer 3, a standard information acquirer 4 and a creator 5 as functions. The CPU of the analysis information management device 10 executes a report creation program stored in the memory, whereby the functions of the analysis information management device 10 are implemented. Part or all of the functions of the analysis information management device 10 may be implemented by hardware such as an electronic circuit.

The receiver 1 receives an instruction for creating an integrated report. The user can select a desired batch file from a batch file displayed in the display unit 12 and provide an instruction for creating an integrated report by performing a predetermined operation with the use of the operation unit 11. The user can further select an analysis result obtained by one or more single analyses in addition to the batch file when providing the instruction for creating an integrated report.

The related information acquirer 2 acquires the batch related information corresponding to the batch file selected by the receiver 1 from the database device 20. The analysis result acquirer 3 acquires analysis data of a batch analysis (hereinafter referred to as batch analysis data) corresponding to the batch file selected by the receiver 1 from the database device 20. In a case where an analysis result of a single analysis is selected by the receiver 1, the analysis result acquirer 3 further acquires analysis data (hereinafter referred to as single analysis data) representing the selected analysis result from the database device 20. The standard information acquirer 4 acquires the standard information corresponding to the batch file selected by the receiver 1 from the database device 20.

The creator 5 creates an integrated report based on the batch related information acquired by the related information acquirer 2, the analysis data acquired by the analysis result acquirer 3 and the standard information acquired by the standard information acquirer 4. The integrated report may be created in a generic file format such as a PDF (Portable Document Format). Further, the creator 5 registers the created integrated report in the database device 20. The creator 5 may cause the display unit 12 to display the created integrated report.

Figure 3:
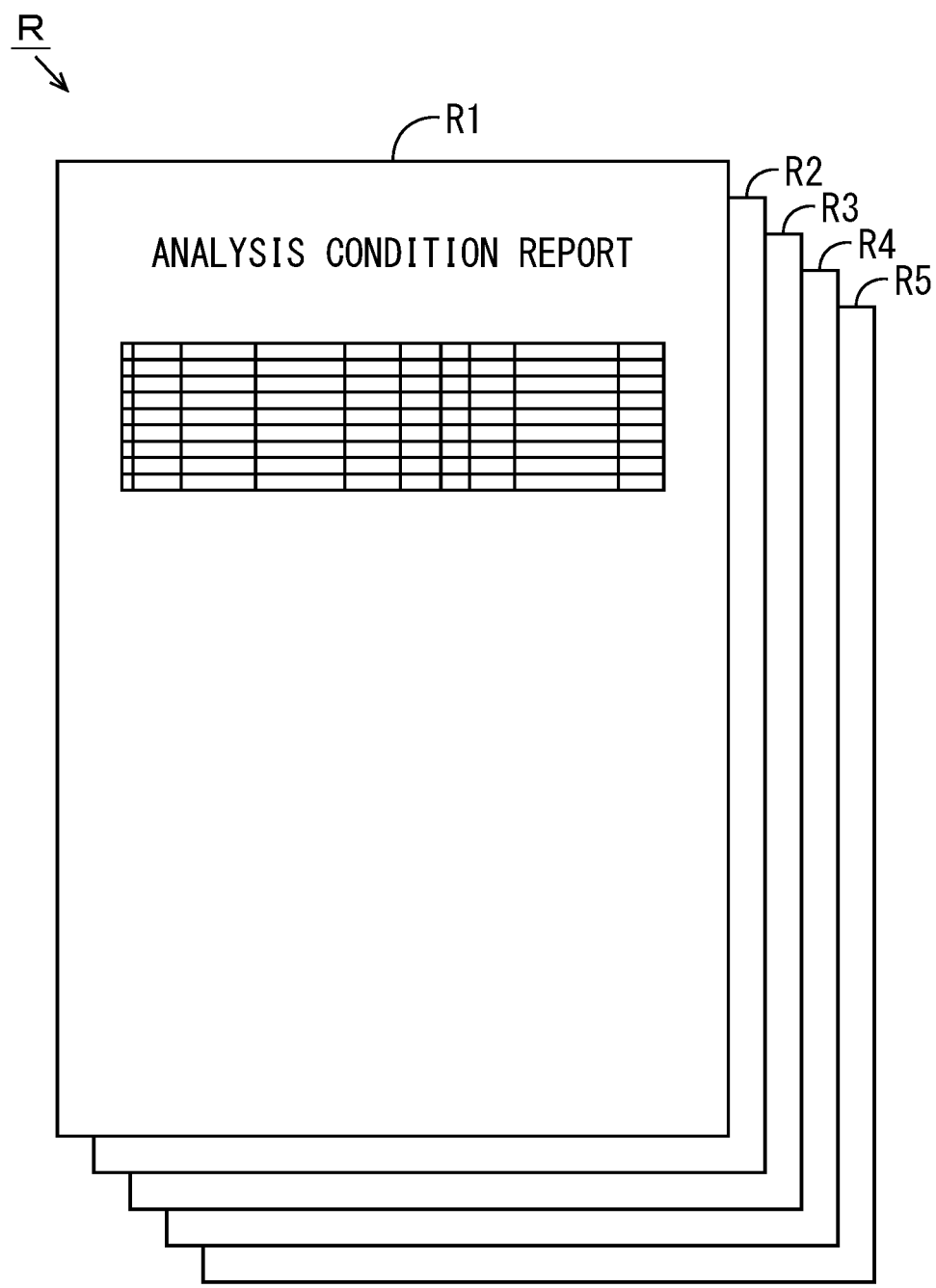
FIG. 3 is a diagram showing an integrated report created by the analysis information management device.

FIG. 3 is a diagram showing an integrated report created by the analysis information management device 10. As shown in FIG. 3, the integrated report R includes an analysis condition report R1, an operation history report R2, an analysis result report R3, a QA/QC report R4 and a system suitability report R5. Each of the analysis condition report R1, the operation history report R2, the analysis result report R3, the QA/QC report R4 and the system suitability report R5 may include a plurality of pages.

The analysis condition report R1 describes a list of a file name of analysis data in regard to each of analyses that are sequentially performed, date and time of an analysis, information about an analyst, an identifier of analysis data, an identifier of the analysis device 30 or the like. Further, the analysis condition report R1 describes a list of a number of a container, a type, a concentration, a name, an identifier or the like in regard to an analysis sample. Further, the analysis condition report R1 describes information representing a device parameter of each constituent element of the analysis device 30, a method of processing analysis data or a calibration curve produced by an analysis.

The operation history report R2 describes the operation history of the analysis information management device 10 such as log-in, log-out, an operation in regard to a file, a start of an analysis, an end of an analysis, acquisition of analysis data, a start of an application, an end of an application or the like. The analysis result report R3 describes an analysis result such as a chromatogram or a mass spectrum in each analysis.

The QA/QC report R4 describes whether an analysis result meets the standard based on the QA/QC information in regard to each sample. The system suitability report R5 describes whether stability of the analysis device 30 meets the standard based on the system suitability information in each analysis. Each of the analysis result report R3, the QA/QC report R4 and the system suitability report R5 may further describe an analysis condition corresponding to a performed analysis.

(3) Report Creation Process

Figure 4:
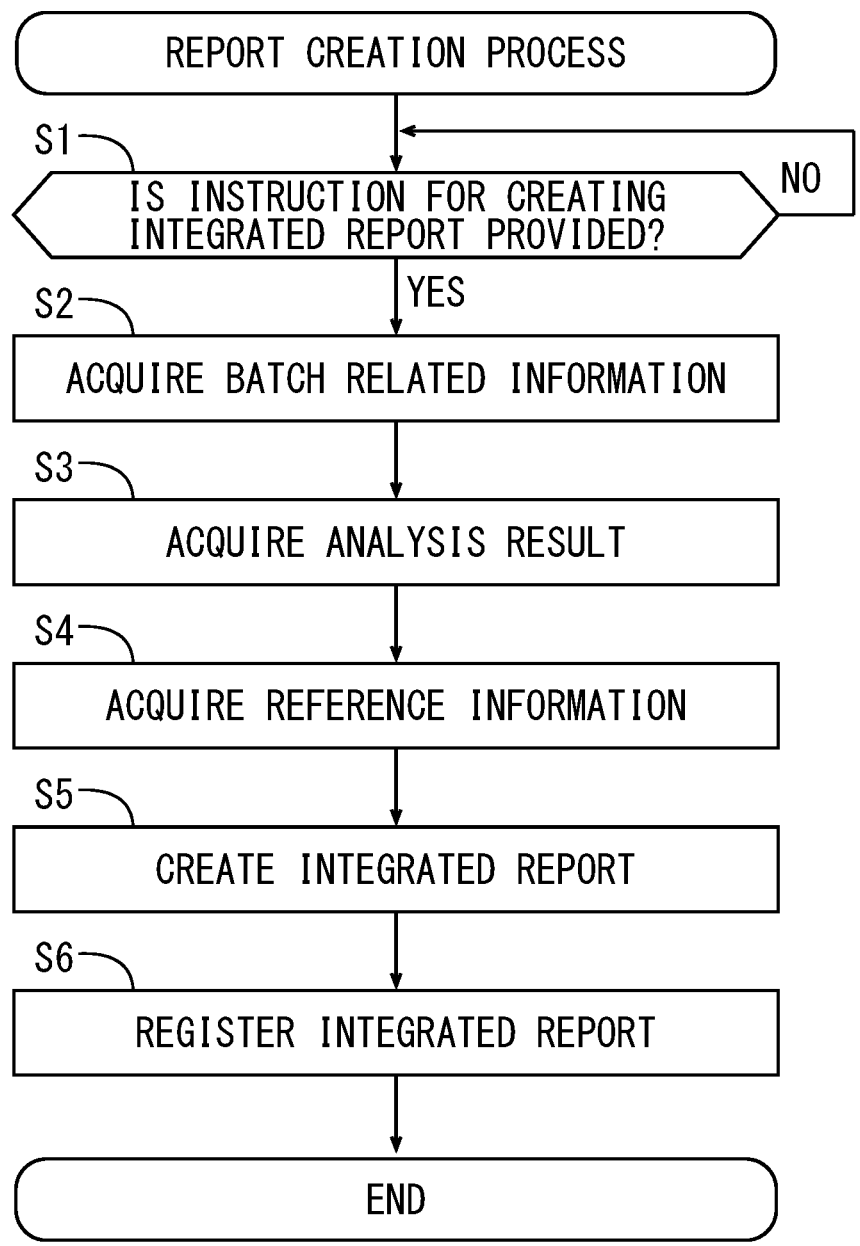
FIG. 4 is a flowchart showing one example of the algorithm of a report creation process executed by the analysis information management device.

FIG. 4 is a flowchart showing one example of the algorithm of a report creation process executed by the analysis information management device 10. First, the receiver 1 determines whether the user has provided an instruction for creating an integrated report R (step S1). When providing the instruction for creating the integrated report R, the user selects a desired batch file and an analysis result of 0 or more than 0 single analyses. In a case where the instruction for creating the integrated report R is not provided, the receiver 1 waits until the instruction for creating the integrated report R is provided.

In a case where the instruction for creating the integrated report R is provided, the related information acquirer 2 acquires batch related information corresponding to the batch file selected in the step S1 from the database device 20 (step S2). The analysis result acquirer 3 acquires batch analysis data corresponding to the batch file selected in the step S1 from the database device 20 (step S3). The standard information acquirer 4 acquires the standard information corresponding to the batch file selected in the step S1 from the database device 20 (step S4).

Any of the steps S2, S3 and S4 may be performed first, or all of the steps S2, S3 and S4 may be performed at the same time. In a case where an analysis result of a single analysis is selected in the step S1, the analysis result acquirer 3 further acquires the single analysis data representing the selected analysis result from the database device 20 in the step S3.

The creator 5 creates the integrated report R based on the batch related information acquired in the step S2, the analysis data acquired in the step S3 and the standard information acquired in the step S4 (step S5). In the step S5, the creator 5 may individually create an analysis condition report R1, an operation history report R2, an analysis result report R3, a QA/QC report R4 and a system suitability report R5 and may create the integrated report R by integrating the plurality of created reports. Thereafter, the creator 5 registers the integrated report R created in the step S5 in the database device 20 (step S6) and ends the report creation process.

(4) Effects

In the analysis information management device 10 according to the present embodiment, selection of a batch file that causes the analysis device 30 to successively analyze a sample is received by the receiver 1. The batch analysis data representing an analysis result corresponding to the batch file, selection of which is received by the receiver 1, is acquired by the analysis result acquirer 3 from the database device 20.

The standard information, for verifying validity of an analysis performed by the analysis device 30, which corresponds to the batch file, the selection of which is received by the receiver 1, is acquired by the standard information acquirer 4. The integrated report R is created by the creator 5 based on the batch analysis data acquired by the analysis result acquirer 3 and the standard information acquired by the standard information acquirer 4.

With the configuration, the analysis result represented by the batch analysis data and an evaluation result in regard to validity of the analysis performed by the analysis device 30 are included in the integrated report R. Therefore, in an audit of the analysis device 30, it is possible to prove validity of the analysis by presenting the created integrated report R. Therefore, it is not necessary to separately present a report for proving validity of the analysis.

Further, in the analysis system 100, a single analysis may be performed separately from a batch analysis as a trial analysis. Even in such a case, because a result of the single analysis is included in the integrated report R, it is not necessary to separately present a report representing a result of the single analysis in the audit of the analysis device 30.

Therefore, time and labor required for the audit is reduced. Further, a report not corresponding to the analysis result represented by the batch analysis data is prevented from being erroneously presented. Thus, it is possible to conduct an audit of the analysis device 30 appropriately and easily.

(5) Other Embodiments

While the integrated report R includes the analysis condition report R1, the operation history report R2, the analysis result report R3, the QA/QC report R4 and the system suitability report R5 in the above-mentioned embodiment, the embodiment is not limited to this. An integrated report R does not have to include an analysis condition report R1 and does not have to include an operation history report R2. Further, an integrated report R does not have to include one of a QA/QC report R4 and a system suitability report R5.

Further, while the integrated report R includes a result of a single analysis in the above-mentioned embodiment, the embodiment is not limited to this. An integrated report R does not have to include a result of a single analysis.

Further, while the analysis information management device 10 registers the created integrated report R in the database device 20 in the above-mentioned embodiment, the embodiment is not limited to this. The analysis information management device 10 does not have to register a created integrated report R in the database device 20. Alternatively, the analysis information management device 10 may register a created integrated report R in the database device 20 in response to a user's instruction.

(6) Aspects

It is understood by those skilled in the art that the plurality of above-mentioned illustrative embodiments are specific examples of the below-mentioned aspects.

(Item 1) An analysis information management device according to one aspect is communicable with a database device in which a batch file causing an analysis device to analyze a sample successively, wherein batch analysis data representing an analysis result that is obtained by the analysis device and corresponds to the batch file, and standard information for verifying validity of an analysis performed by the analysis device are registered in the database device, to correspond to the batch file, and the analysis information management device includes a receiver that receives selection of the batch file registered in the database device, an analysis result acquirer that acquires the batch analysis data corresponding to the batch file, selection of which is received by the receiver, from the database device, a standard information acquirer that acquires the standard information corresponding to the batch file, selection of which is received by the receiver, from the database device, and a creator that creates a report including an analysis result represented by the batch analysis data and an evaluation result in regard to validity of an analysis performed by the analysis device based on the batch analysis data acquired by the analysis result acquirer and the standard information acquired by the standard information acquirer.

In the analysis information management device, the analysis result represented by the batch analysis data and the evaluation result in regard to the validity of the analysis performed by the analysis device are included in the report. Therefore, in an audit of the analysis device, it is possible to prove the validity of the analysis by presenting the created report. Therefore, it is not necessary to separately present a report for proving the validity of the analysis. In this case, time and labor required for the audit is reduced. Further, a report not corresponding to the analysis result represented by the batch analysis data is prevented from being erroneously presented. Thus, it is possible to conduct an audit of the analysis device appropriately and easily.

(Item 2) In the analysis information management device according to item 1, the standard information may include system suitability information defining stability of the analysis device, and the creator may create the report including whether stability of the analysis device meets a standard in an analysis as an evaluation result in regard to validity of the analysis performed by the analysis device.

In this case, whether the stability of the analysis device in the analysis meets the standard can be presented easily by the report as validity of the analysis.

(Item 3) In the analysis information management device according to item 1 or 2, the standard information may include quality assistance/quality control information that defines reliability of an analysis result, and the creator may create the report including whether an analysis result with respect to a sample meets a standard as an evaluation result in regard to validity of an analysis performed by the analysis device.

In this case, whether the analysis result with respect to the sample meets the standard can be represented easily by the report as validity of the analysis.

(Item 4) In the analysis information management device according to any one of items 1 to 3, history information representing operation history of the analysis information management device may further be registered in the database device, the analysis information management device may further include a history information acquirer that acquires the history information corresponding to the batch file, selection of which is received by the receiver, from the database device, and the creator may create the report further including operation history represented by the history information acquired by the history information acquirer.

In this case, the operation history of the analysis information management device is further represented by the report. Thus, it is possible to conduct the audit of the analysis device easily and more appropriately.

(Item 5) In the analysis information management device according to any one of items 1 to 4, single analysis data representing a result of a single sample analysis in accordance with a predetermined analysis method may further be registered in the database device, the receiver may further receive selection of the single analysis data registered in the database device, the analysis result acquirer may acquire the single analysis data, selection of which is received by the receiver, from the database device, and the creator may create the report further including an analysis result represented by the single analysis data acquired by the analysis result acquirer.

With this configuration, even in a case where the single analysis of the sample is performed separately from an successive analysis of a sample in accordance with the batch file, a result of the analysis is included in the report. Therefore, in the audit of the analysis device, it is not necessary to separately present a report representing the result of the single sample analysis. In this case, time and labor required for the audit is reduced. Further, a report not corresponding to the analysis result represented by the batch analysis data is prevented from being erroneously presented. Thus, it is possible to conduct the audit of the analysis device easily and more appropriately.

(Item 6) An analysis information management method according to another aspect is an analysis information management method of communicating with a database device in which a batch file causing an analysis device to analyze a sample successively, wherein batch analysis data representing an analysis result that is obtained by the analysis device and corresponds to the batch file, and standard information for verifying validity of an analysis performed by the analysis device may be registered in the database device, to correspond to the batch file, the analysis information management method may include receiving selection of the batch file registered in the database device, acquiring the batch analysis data corresponding to the batch file, selection of which is received, from the database device, acquiring the standard information corresponding to the batch file, selection of which is received, from the database device, and creating a report describing an analysis result represented by the batch analysis data and an evaluation result in regard to validity of an analysis performed by the analysis device based on the acquired batch analysis data and the acquired standard information.

With the analysis information management method, in the audit of the analysis device, it is possible to prove validity of the analysis by presenting the created report. Therefore, it is not necessary to separately present a report for proving the validity of the analysis. In this case, time and labor required for the audit is reduced. Further, a report not corresponding to the analysis result represented by the batch analysis data is prevented from being erroneously presented. Thus, it is possible to conduct the audit of the analysis device appropriately and easily.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analysis information management device that is communicable with a database device in which a batch file, causing an analysis device to analyze a sample successively, is registered, wherein
batch analysis data representing an analysis result that is obtained by the analysis device and corresponds to the batch file, and standard information for verifying validity of an analysis performed by the analysis device are registered in the database device, to correspond to the batch file, and
the analysis information management device includes a receiver that receives selection of the batch file registered in the database device, an analysis result acquirer that acquires the batch analysis data corresponding to the batch file, selection of which is received by the receiver, from the database device, a standard information acquirer that acquires the standard information corresponding to the batch file, selection of which is received by the receiver, from the database device, and a creator that creates a report including an analysis result represented by the batch analysis data and an evaluation result in regard to validity of an analysis performed by the analysis device based on the batch analysis data acquired by the analysis result acquirer and the standard information acquired by the standard information acquirer.

2. The analysis information management device according to claim 1, wherein the standard information includes system suitability information defining stability of the analysis device, and the creator creates the report including whether stability of the analysis device meets a standard in an analysis as an evaluation result in regard to validity of the analysis performed by the analysis device.

3. The analysis information management device according to claim 1, wherein the standard information includes quality assistance/quality control information that defines reliability of an analysis result, and the creator creates the report including whether an analysis result with respect to a sample meets a standard as an evaluation result in regard to validity of an analysis performed by the analysis device.

4. The analysis information management device according to claim 1, wherein history information representing operation history of the analysis information management device is further registered in the database device, the analysis information management device further includes a history information acquirer that acquires the history information corresponding to the batch file, selection of which is received by the receiver, from the database device, and the creator creates the report further including operation history represented by the history information acquired by the history information acquirer.

5. The analysis information management device according to claim 1, wherein single analysis data representing a result of a single sample analysis in accordance with a predetermined analysis method is further registered in the database device, the receiver further receives selection of the single analysis data registered in the database device, the analysis result acquirer acquires the single analysis data, selection of which is received by the receiver, from the database device, and the creator creates the report further including an analysis result represented by the single analysis data acquired by the analysis result acquirer.

6. An analysis information management method of communicating with a database device in which a batch file, causing an analysis device to analyze a sample successively, is registered, wherein batch analysis data representing an analysis result that is obtained by the analysis device and corresponds to the batch file, and standard information for verifying validity of an analysis performed by the analysis device are registered in the database device, to correspond to the batch file, the analysis information management method includes receiving selection of the batch file registered in the database device, acquiring the batch analysis data corresponding to the batch file, selection of which is received, from the database device, acquiring the standard information corresponding to the batch file, selection of which is received, from the database device, and creating a report describing an analysis result represented by the batch analysis data and an evaluation result in regard to validity of an analysis performed by the analysis device based on the acquired batch analysis data and the acquired standard information.

* * * * *